June 19, 1956     R. POLK, JR     2,750,878
JUICE EXTRACTOR
Filed Dec. 8, 1953
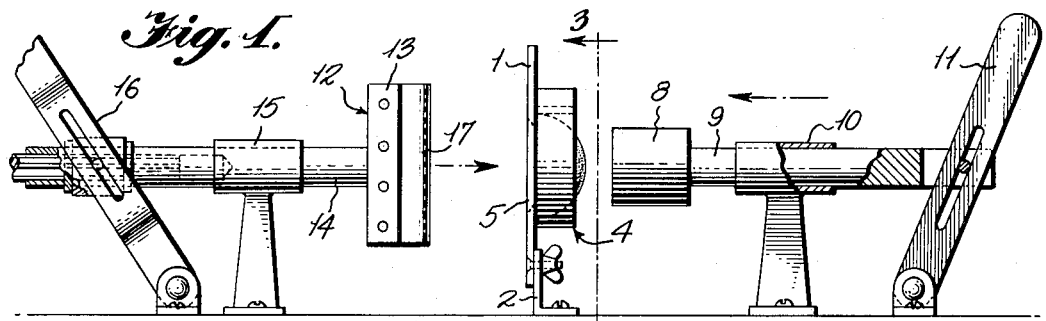
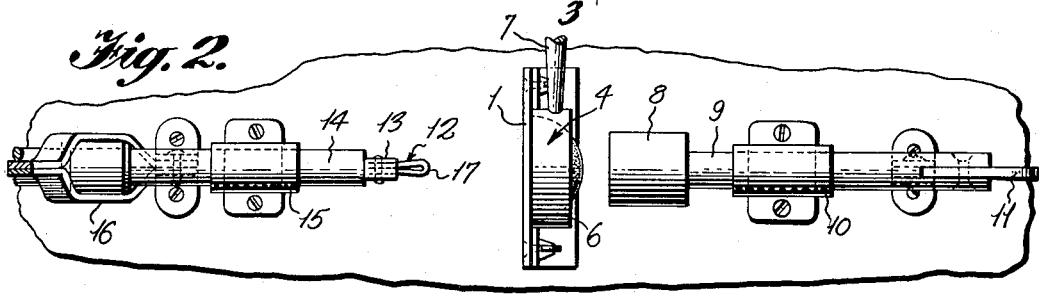
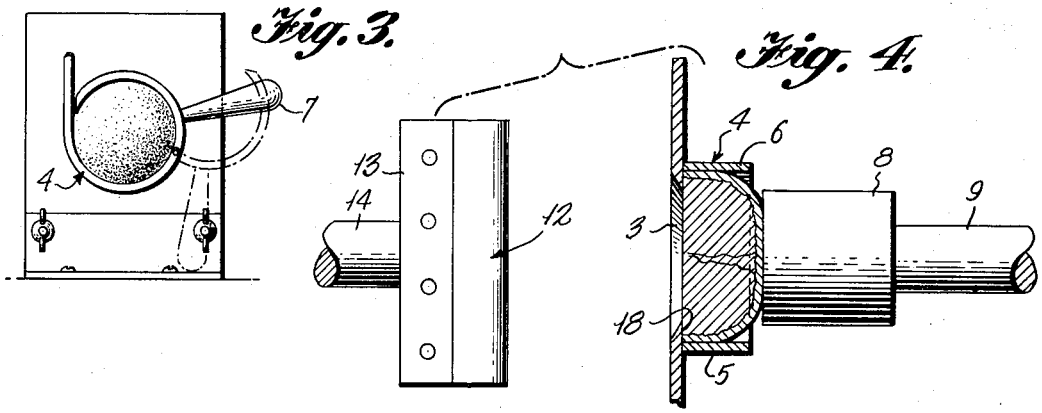
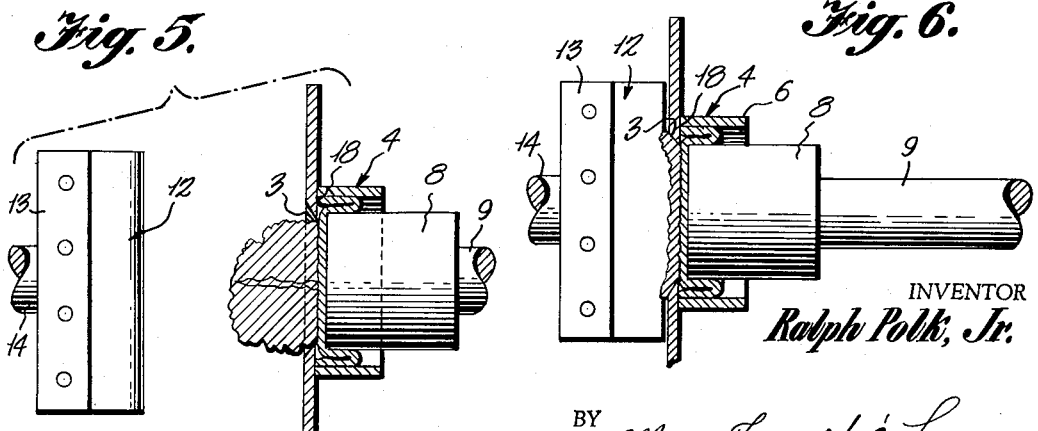
INVENTOR
*Ralph Polk, Jr.*
BY *Mason, Fenwick & Lawrence*
ATTORNEYS United States Patent Office 2,750,878
Patented June 19, 1956

2,750,878

JUICE EXTRACTOR

Ralph Polk, Jr., Tampa, Fla.

Application December 8, 1953, Serial No. 396,823

14 Claims. (Cl. 100—37)

This invention relates to a method and means for the extraction of juice from citrus fruit, and particularly to apparatus for this purpose.

The problem of extraction of juice has been given considerable attention over many years. The methods generally used have fallen into two categories; forcing a reamer into the pulp and rotating it to express the juice, and forcing the juice from the fruit by a compressive force which crushes the fruit. Both of these methods produce undesirable characteristics in the juice when performed by mechanical means. The harsh action of the reamer and the tremendous pressure required in compression extraction result in expressing from the albedo (white portions of the peel) and from the core and partitions (called rag) liquids which are bitter and off flavor, and which contain substantial amounts of pectin. Because of this pectin content in the juice, considerable trouble has been experienced with frozen orange juice concentrates, due to jelling or the concentrate becoming semi-solid in the can so that it would not mix with water as intended. This necessitated heating the juice prior to concentrating to inactivate the pectin. As heating affects flavor this is undesirable.

The primary object of the present invention is to provide a method for extracting juice from citrus fruit whereby substantially all of the juice will be expressed free from mixture with the undesirable pectin-containing liquids from the rag and albedo.

Another object of the invention is to provide mechanical juice extracting means which will remove maximum amounts of juice from the fruit with minimum pressure and abrasion.

A more specific object is to provide such method and means which will bring the major portion of the fruit peel into a flat plane while thrusting the rag and pulp beyond that plane where the juice can be removed, and maintaining the peel and pulp on opposite sides of a partition so that the juice and any oils expressed from the peel will be kept separated.

A further object is to remove the juice from the pulp and rag by a gentle wiping contact or squeegee action which will not tear the rag but will leave it attached to the peel.

Another object is to provide juice extracting means which permits employment of flexible means to express the juice.

Still another object is to provide such means which will be operable with fruit of different sizes.

Other objects of the invention will become apparent from the following description of one practical embodiment thereof when taken in conjunction with the drawings which accompany, and form part of, this specification.

In the drawings:

Figure 1 is a side elevation of mechanical juice extracting means embodying the principles of the present invention;

Figure 2 is a top plan view of the apparatus shown in Figure 1;

Figure 3 is a vertical section taken on the line 3—3 of Figure 1, showing the fruit-receiving sleeve and peel-retaining plate associated therewith; and Figures 4, 5 and 6 illustrate the apparatus in various stages of expressing the juice from a fruit-half.

In general, the method of the invention consists in placing the cut surface of half a citrus fruit against a plate having an orifice, partially evaginating the fruit to project the pulp and rag through the opening and removing the juice by a gentle wiping or squeegee action. The invention also includes a mechanical device which comprises a sleeve to receive, and peripherally confine half of a citrus fruit, with the cut face of the fruit contacting a plate having a central orifice through which the pulp and rag are projected by compression of the major portion of the peel into the plane of the plate, and a rotatable, flexible wiper element to contact the exposed pulp and rag to express the juice therefrom. Although means have been shown herein to move various elements of the extractor to and from engagement with the fruit, these are merely illustrations of means for this purpose and do not per se form part of this invention.

In detail, the method consists in cutting the fruit in half and placing the cut surface of the fruit against a plate having an orifice. The orifice is of slightly less diameter than the fruit, so that at least the peel portion will rest upon the surface of the plate surrounding the orifice. With the fruit held firmly in place, the rounded end of the fruit is forced inward to partially evaginate it. The pressure is continued until the major portion of the peel lies in a common plane, substantially flush with the surface of the plate. This action will cause the pulp and rag to be torn free from the outer part of the peel and projected through the orifice in the plate remaining attached to the central portions of the peel. The projecting pulp is then wiped or squeegeed with a flexible blade to express the juice. This last action is performed on the opposite side of the plate from that against which the fruit is originally placed, and the plate serves as a partition to keep the juice separated from the peel and any oil which may be released from the peel during the pressing step. The method may be rendered even more effective by confining the cut edge of the peel against radial expansion during the partial evagination.

This method of extracting juice does not subject the fruit to any of the harsh action present in former methods, yet due to the projection of the pulp beyond the plane of the peel and the wiping or squeegeeing of the pulp with a flexible member substantially all of the juice will be removed. The method may be carried out by hand, or it may be performed by mechanical means such as are shown in the drawings.

Referring to the drawings in detail, there is shown an orifice plate 1, which is vertically positioned and may be supported in any suitable manner, such as by the bracket 2. The plate is provided with an opening 3 in its center which is beveled. The size of the opening at the smaller end is such that when half of a citrus fruit is placed against the plate, concentric to the opening, the cut surface of the peel will be in contact with the plate and none of it will be exposed within the opening, irrespective of the thickness of the peel. A cylindrical sleeve 4 is mounted upon the plate with its axis concentric to the axis of the opening 3 and upon that side of the plate having the smaller opening of the tapered hole. The sleeve has a diameter equal to the diameter of the smallest fruit which is to be used with the device, and it is contemplated that a sleeve having this size may be used with fruit having diameters from that of the sleeve to ½" larger.

In order to accommodate the larger sizes of fruit, that is those larger than the diameter of the sleeve, the sleeve is made in two sections, one of which is rigidly fixed to the plate in any desired manner with the other being hinged to the fixed section. When the fruit half is to be inserted in the sleeve it will be placed within the fixed section 5 while the pivoted section 6 is open, as shown in dotted lines in Figure 3. By means of a handle 7 connected to the pivoted section, that section is then swung about its pivot to enclose the fruit half within the sleeve. If the fruit is of larger diameter than the sleeve this action will impose pressure around the entire circumference of the fruit half to reduce its size to the size of the sleeve. Due to the circular shape of the sleeve this pressure will be substantially equal around the circumference of the fruit. The pivoted section may then be manually held in place during the subsequent extraction of the juice of the fruit.

When the sleeve is closed, the cut face of the fruit will be centered against the surface of the plate 1 with the pulp portion aligned with the opening 3 and the peel in surface contact with the annular section of the plate surrounding the opening and within the sleeve 4.

As mentioned above, the sleeve will accommodate fruit having up to ½" variation in size. Due to the fact that oranges in the sizes used commercially vary from 2½" to 3½" in diameter and grapefruit from 3½" to 5", it will probably be necessary to use two sizes of sleeve for oranges and two for grapefruit. Thus, in the case of oranges, one machine could be set up to handle fruit 2½" to 3" in diameter and another from 3" to 3½".

A plunger 8 is employed to compress the fruit half to project the pulp and rag through the opening 3 beyond the outer surface of the plate to a position where the juice may be extracted. Plunger 8 is a cylindrical member which has a flat, vertical head surface and is of smaller diameter than the inside diameter of the sleeve. The plunger is mounted so as to be concentric with the sleeve and to move axially thereof. The difference in diameter between the plunger and the sleeve is such that a double thickness of the fruit peel may lie in the annulus between the circumference of the plunger and that of the sleeve when the plunger has moved to a position within the sleeve. Insofar as the present invention is concerned, it is only necessary that the plunger be mounted as described, but for purpose of illustration the plunger is shown as being mounted upon the end of a plunger rod 9 reciprocably mounted in a bearing 10, which rod may be moved by a lever 11 to move the plunger into the sleeve and retract it therefrom. When the plunger is moved into the sleeve, the peel of the fruit is partially evaginated to project the pulp and rag through the opening 3 where it can be contacted by a flexible wiper element 12.

The wiper is shown as comprising a holder 13 which is mounted upon the end of a shaft 14 at right angles thereto and the shaft is supported in a suitable bearing 15. Shaft 14 may be rotated from any convenient source of power. A lever 16 is shown for moving the wiper element toward and from plate 1. The holder 13 serves to mount a wiper blade or squeegee 17 at the extreme end of the assembly, which blade is a fairly thick and substantial piece of quite flexible material, such as rubber. By means of movement of lever 16, blade 17 may be brought into contact with the fruit pulp which has been projected through the opening in the plate, and by a gentle rubbing action express the juice from the pulp and rag.

By referring to Figures 4, 5, and 6 of the drawing the method of extracting the juice and the operation of the various parts of the extractor will be seen. The fruit is first cut in half transversely of the core, and half of the fruit is placed within the sleeve with the cut surface in contact with the annular shoulder 18 of the plate. When the sleeve is closed, the cut end of the fruit will be confined to the diameter of the sleeve and the peel will be held firmly in place against radial expansion. Plunger 8 is then moved into the sleeve, compressing the fruit and forcing the peel edge into sealing contact with the plate, as shown in Figure 4. As the cut edge of the peel is held against movement, the rounded portion of the fruit will be flattened and pressed inwardly until it is brought into contact with the surface of the plate, as shown in Figure 5. This partially turns the fruit inside out and forces the pulp and rag through the opening 3 in the plate to project beyond the opposite side of the plate. During this process, those portions of the peel of larger diameter than the plunger will be doubled over, or pressed within the end portions of the peel which are against the shoulder 18 of the plate. During this pressing and sliding movement of portions of the peel over and against other portions thereof, all of the pulp and rag will be torn free from these sections, so that when the plunger reaches the end of its stroke and the central portion of the peel is flattened into the plane of the plate, the entire pulp and rag will be projecting beyond this flattened portion of the peel and through the opening in the plate. While the peel is held in this position the rotating wiper blade is brought into contact with the projecting pulp to extract the juice. Due to its flexibility the blade will gently rub the pulp to break the pulp cells and release the juice without tearing the rag and releasing the undesirable flavors. The flexible blade may move up into contact with the outside face of the plate and will conform itself to the shape of the plate and tapered opening 3 so that substantially all of the juice will be removed from the pulp. The great flexiblity of the blade will permit this action without tearing the rag from the peel.

It will be noted that plate 1 serves as a barrier separating the peel from the pulp and rag during the juice extracting operation. As the opening 3 flares outwardly any juice which is extracted from the pulp close to the peel within the opening will flow outwardly where it may be caught. If, during the pressing of the peel into its flattened condition, any oils are forced from the peel, those oils will run down the inside surface of the plate and will not be mixed with the juice. In other words, the plate serves as a partition to separate the juice bearing portions of the fruit from the undesirable oil bearing portions, and if oils are released, keeps these oils from mixing with the juice.

While in the above the method and one practical mechanical embodiment of the invention has been disclosed, it will be understood that the details of construction described and shown are merely by way of example and that many changes may be made from this specific construction within the scope of the appended claims.

What is claimed is:

1. Apparatus for mechanically extracting juice from citrus fruit halves comprising, a plate having an opening therein, means to receive a fruit half with the cut surface against the plate and position the cut surface overlying said opening, means movable to contact the crown of the fruit and press it toward said plate to flatten a portion of the peel of the fruit into a plane contiguous to the surface of the plate and project the pulp and rag of the fruit through said opening, and rotatable means movable toward and from said plate on the side opposite to that against which said fruit is placed to contact the projected pulp and rag of the fruit to express the juice therefrom.

2. In apparatus as claimed in claim 1, said rotatable means including a flexible wiper element to contact the pulp of the fruit.

3. In apparatus as claimed in claim 1, said opening in said orifice plate being tapered to flare outwardly from the side of the plate against which the cut surface of the fruit is placed.

4. Apparatus for mechanically extracting juice from citrus fruit halves comprising, a plate having an opening therethrough, a sleeve of larger diameter than said opening mounted upon one side of said plate and surrounding said opening to receive a fruit half and position it with the cut surface thereof against the plate concentric to and overlying said opening and confine the fruit against expansion radially of the cut surface, a plunger of smaller diameter than the sleeve mounted concentrically to the sleeve for reciprocable movement into and out of the sleeve to contact the crown of the fruit and press it toward the plate to project the pulp and rag of the fruit through said opening, and a rotatable wiper element mounted for reciprocable movement toward and from the side of said plate opposite the side against which said fruit is placed to wipe against the projected pulp and rag to express the juice therefrom.

5. In apparatus as claimed in claim 4, said wiper element being of flexible material.

6. In apparatus as claimed in claim 4, said wiper element being a straight flexible blade.

7. A method for extracting juice from citrus fruit comprising, positioning a half fruit against a plate having an orifice with the cut surface of the fruit substantially concentric to and facing the orifice and overlying the orifice and the marginal rim upon the plate surrounding the orifice, evaginating the fruit to project the pulp through the orifice, and squeegeeing the projected pulp with a flexible blade to express the juice.

8. A method for extracting juice from citrus fruit comprising, positioning a half fruit against a plate having an orifice with the cut surface substantially concentric with and facing the orifice and with the peripheral portion of said surface overlying the marginal rim upon the plate surrounding the orifice, evaginating the fruit to bring a portion of the peel into a plane contiguous to the plate and project the pulp through the orifice, and squeegeeing the projected pulp with a flexible blade to express the juice.

9. Apparatus for mechanically extracting juice from citrus fruit halves comprising, a plate having an opening therein, means on one side of the plate to receive a fruit half with the cut surface against the plate and position the fruit half with the cut surface overlying said opening, means movable to contact the crown of the fruit and press it toward said plate to project the pulp and rag of the fruit through said opening, and means on the side of the plate opposite said one side to remove the juice from the exposed pulp, said means to remove the juice comprising a wiper element mounted for traversing said opening in the plate.

10. Apparatus for mechanically extracting juice from citrus fruit halves comprising, a plate having an opening therethrough, a sleeve of larger diameter than said opening mounted upon one side of said plate to receive a fruit half and position it concentric to said opening with the cut surface against the plate and confine the fruit against expansion radially of the cut surface, a plunger of smaller diameter than the sleeve mounted concentrically to the sleeve for reciprocable movement into and out of the sleeve to contact the crown of the fruit and press it toward the plate to project the pulp and rag of the fruit through said opening, and means on the side of the plate opposite said one side to remove the juice from the exposed pulp, said sleeve being cylindrical in shape and having a fixed section and a movable section hingedly connected to the fixed section.

11. Apparatus for mechanically extracting juice from citrus fruit halves comprising, a plate having an opening therethrough, a sleeve of larger diameter than said opening mounted upon one side of said plate to receive a fruit half and position it concentric to said opening with the cut surface against the plate and confine the fruit against expansion radially of the cut surface, a plunger of smaller diameter than the sleeve mounted concentrically to the sleeve for reciprocable movement into and out of the sleeve to contact the crown of the fruit and press it toward the plate to project the pulp and rag of the fruit through said opening, and means on the side of the plate opposite said one side to remove the juice from the exposed pulp, said opening being tapered to flare outwardly from the side of said plate against which said fruit is placed.

12. Apparatus for mechanically extracting juice from citrus fruit halves comprising, a plate having an opening therein, means to receive a fruit half with the cut surface against the plate and position the fruit half with the cut surface thereof overlying said opening, means movable to contact the crown of the fruit and press it toward said plate to flatten a portion of the peel of the fruit into a plane contiguous to the surface of the plate and project the pulp and rag of the fruit through said opening, and means on the side of said plate opposite to that against which said fruit is placed to contact the projected rag and pulp and movable in a plane parallel to said plate in contact with the projected pulp and rag of the fruit to express the juice therefrom.

13. A method for extracting juice from citrus fruit comprising, positioning a half fruit against a plate having an orifice with the cut surface overlying the orifice, contacting and pressing the crown of the fruit toward the plate to project the pulp through the orifice, contacting the projected pulp with a surface means, while inducing relative movement between the plate and said surface means parallel to the cut end of the fruit.

14. A method for extracting juice from citrus fruit comprising, positioning a half fruit against a plate having an orifice with the cut surface of the fruit half overlying the orifice and with a portion of the cut surface overlying the marginal rim upon the plate surrounding the orifice, evaginating the fruit to project the pulp through the orifice, and squeegeeing the projected pulp to express the juice.

References Cited in the file of this patent

UNITED STATES PATENTS

| | | |
|---|---|---|
| 369,711 | Hodson | Sept. 13, 1887 |
| 630,391 | Morgan | Aug. 8, 1899 |
| 2,212,066 | Fry | Aug. 20, 1940 |
| 2,420,680 | Pipkin | May 20, 1947 |
| 2,517,519 | Wurgaft | Aug. 1, 1950 |
| 2,535,553 | Stoner | Dec. 26, 1950 |